United States Patent
Steinborn et al.

(10) Patent No.: US 12,158,203 B2
(45) Date of Patent: Dec. 3, 2024

(54) METHOD AND CONTROL DEVICE FOR OPERATING A DRIVE TRAIN

(71) Applicant: ZF Friedrichshafen AG, Friedrichshafen (DE)

(72) Inventors: Mario Steinborn, Friedrichshafen (DE); Thea Schlueter, Friedrichshafen (DE); Frieder Norrenberg, Argenbühl (DE); Richard Malínský, Tachov (CZ); Otakar Šprdlík, Štáhlavy (CZ); Martin Fajfr, Štěnovice (CZ); Karel Veisheipl, Týn nad Vltavou (CZ)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/573,655

(22) PCT Filed: Jun. 21, 2022

(86) PCT No.: PCT/EP2022/066784
§ 371 (c)(1),
(2) Date: Dec. 22, 2023

(87) PCT Pub. No.: WO2022/268749
PCT Pub. Date: Dec. 29, 2022

(65) Prior Publication Data
US 2024/0328508 A1   Oct. 3, 2024

(30) Foreign Application Priority Data
Jun. 24, 2021 (DE) ............ 10 2021 206 546.5

(51) Int. Cl.
*F16H 61/12* (2010.01)
*F16H 59/42* (2006.01)
(Continued)

(52) U.S. Cl.
CPC ............ *F16H 61/12* (2013.01); *F16H 59/42* (2013.01); *F16H 59/48* (2013.01); *F16H 59/70* (2013.01);
(Continued)

(58) Field of Classification Search
CPC .......... F16H 61/12; F16H 61/16; F16H 61/70; F16H 59/42; F16H 59/48; F16H 59/70;
(Continued)

(56) References Cited

U.S. PATENT DOCUMENTS

| | | |
|---|---|---|
| 1,926,783 A | 9/1933 | Miller |
| 4,514,811 A | 4/1985 | Daubenmier et al. |

(Continued)

FOREIGN PATENT DOCUMENTS

| | | |
|---|---|---|
| DE | 198 23 764 A1 | 12/1998 |
| DE | 199 04 129 C1 | 2/2000 |

(Continued)

OTHER PUBLICATIONS

German Patent Office, Office Action issued in German patent application No. 10 2021 206 547.3 (Feb. 24, 2022).
(Continued)

*Primary Examiner* — Tinh Dang
(74) *Attorney, Agent, or Firm* — Finch & Maloney PLLC

(57) ABSTRACT

A method for operating a motor vehicle drive train having a drive aggregate, an automated group transmission connected between the drive aggregate and a drive output, and a disconnect clutch connected between the drive aggregate and the group transmission. The group transmission has a plurality of sub-transmissions, including a main transmission, a splitter group upstream from the main transmission, and a range group downstream from the main transmission. When the disconnect clutch cannot be shifted to carry out a shifting operation in the group transmission, an emergency
(Continued)

shifting program is activated. Shifting from a current gear to a target gear is carried out automatically, as a function of input rotation speed of the group transmission or as a function of rotation speed of the drive aggregate, while the disconnect clutch is closed and where the main transmission and/or the range group participate exclusively, but not the splitter group.

9 Claims, 3 Drawing Sheets

(51) Int. Cl.
*F16H 59/48* (2006.01)
*F16H 59/70* (2006.01)
*F16H 61/16* (2006.01)
*F16H 61/70* (2006.01)
*F16H 59/36* (2006.01)

(52) U.S. Cl.
CPC ............. *F16H 61/16* (2013.01); *F16H 61/70* (2013.01); *F16H 2059/366* (2013.01); *F16H 2061/1224* (2013.01); *F16H 2061/128* (2013.01); *F16H 2061/166* (2013.01)

(58) Field of Classification Search
CPC ....... F16H 2059/366; F16H 2061/1224; F16H 2061/128; F16H 2061/166
See application file for complete search history.

(56) References Cited

U.S. PATENT DOCUMENTS

| | | | |
|---|---|---|---|
| 4,911,275 A | 3/1990 | Ohkumo et al. | |
| 5,441,463 A | 8/1995 | Steeby | |
| 5,875,409 A | 2/1999 | Steeby et al. | |
| 5,941,925 A | 8/1999 | Hess et al. | |
| 5,984,828 A | 11/1999 | Huber | |
| 6,044,721 A | 4/2000 | Genise | |
| 6,497,635 B2 | 12/2002 | Suzuki | |
| 6,507,780 B2 | 1/2003 | Graf | |
| 6,770,010 B2 | 8/2004 | Matsumura et al. | |
| 6,881,171 B2 | 4/2005 | Kuhstrebe et al. | |
| 6,939,265 B2 | 9/2005 | Rustige et al. | |
| 7,134,355 B2 | 11/2006 | Eriksson et al. | |
| 7,223,204 B2 | 5/2007 | Steen et al. | |
| 7,344,474 B2 | 3/2008 | Stasik et al. | |
| 7,662,063 B2 | 2/2010 | Schnitzer | |
| 7,862,470 B2 | 1/2011 | Eguchi et al. | |
| 7,935,024 B2 | 5/2011 | Winkel et al. | |
| 7,976,431 B2 | 7/2011 | Bader et al. | |
| 8,066,617 B2 | 11/2011 | Steinborn et al. | |
| 8,192,327 B2 | 6/2012 | Gibson et al. | |
| 8,200,402 B2 | 6/2012 | Doebele et al. | |
| 8,332,120 B2 | 12/2012 | Bjernetun et al. | |
| 8,521,379 B2 | 8/2013 | Wurthner et al. | |
| 8,663,067 B2 | 3/2014 | Mair et al. | |
| 8,979,707 B2 | 3/2015 | Kemler et al. | |
| 10,654,480 B2 | 5/2020 | Kagerer et al. | |
| 11,279,359 B2 | 3/2022 | Plianos et al. | |
| 2001/0011484 A1 | 8/2001 | Ruhle et al. | |
| 2001/0023384 A1* | 9/2001 | Nishimura | B60W 30/18 701/59 |
| 2001/0023385 A1 | 9/2001 | Nishimura et al. | |
| 2001/0027148 A1* | 10/2001 | Nishimura | B60W 30/18027 477/92 |
| 2004/0228946 A1 | 11/2004 | Yokoyama et al. | |
| 2005/0096181 A1 | 5/2005 | DeVore et al. | |
| 2006/0160661 A1 | 7/2006 | Stasik et al. | |
| 2006/0211536 A1 | 9/2006 | Guggolz et al. | |
| 2006/0240943 A1 | 10/2006 | Winkel et al. | |
| 2008/0243349 A1 | 10/2008 | Trautenberg | |
| 2009/0071277 A1* | 3/2009 | Bader | F16H 37/046 477/110 |
| 2010/0285922 A1 | 11/2010 | Breuer et al. | |
| 2010/0286884 A1 | 11/2010 | Bunn | |
| 2012/0178586 A1* | 7/2012 | Kemler | F16H 61/12 477/79 |
| 2014/0100072 A1* | 4/2014 | Kaltenbach | F16H 3/126 475/151 |

FOREIGN PATENT DOCUMENTS

| | | |
|---|---|---|
| DE | 103 61 299 A1 | 7/2005 |
| DE | 10 2004 017 115 A1 | 10/2005 |
| DE | 10 2004 038 520 A1 | 2/2006 |
| DE | 10 2005 049 198 A1 | 4/2007 |
| DE | 10 2007 006 501 A1 | 8/2008 |
| DE | 10 2007 036 794 A1 | 2/2009 |
| DE | 10 2008 023 135 A1 | 11/2009 |
| DE | 10 2011 005 320 A1 | 9/2012 |
| DE | 10 2011 088 833 A1 | 6/2013 |
| DE | 10 2014 016 932 A1 | 5/2015 |
| DE | 10 2014 012 984 A1 | 3/2016 |
| DE | 10 2018 000 734 A1 | 8/2018 |
| DE | 10 2017 204 224 A1 | 9/2018 |
| EP | 0 427 000 A2 | 10/1990 |
| EP | 1 316 463 A2 | 6/2003 |
| EP | 1 923 291 A2 | 5/2008 |
| WO | 02/06015 A1 | 8/2002 |
| WO | 2004/037590 A1 | 5/2004 |
| WO | 2008/107318 A1 | 9/2008 |

OTHER PUBLICATIONS

European Patent Office, International Search Report issued in International patent application No. PCT/EP2022/066785 (Oct. 14, 2022).

European Patent Office, Written Opinion issued in International patent application No. PCT/EP2022/066785 (Oct. 14, 2022).

German Patent Office, Office Action issued in German patent application No. 10 2021 206 546.5 (Mar. 22, 2022).

European Patent Office, International Search Report issued in International patent application No. PCT/EP2022/066784 (Sep. 23, 2022).

European Patent Office, Written Opinion issued in International patent application No. PCT/EP2022/066784 (Sep. 23, 2022).

German Patent Office, Office Action issued in German patent application No. 10 2021 206 541.4 (Jan. 14, 2022).

European Patent Office, International Search Report issued in International patent application No. PCT/EP2022/066782 (Sep. 15, 2022).

European Patent Office, Written Opinion issued in International patent application No. PCT/EP2022/066782 (Sep. 15, 2022).

* cited by examiner

METHOD AND CONTROL DEVICE FOR OPERATING A DRIVE TRAIN

RELATED APPLICATIONS

This application claims the benefit under 35 U.S.C. § 371 as a U.S. National Phase Application of application no. PCT/EP2022/066784, filed on 21 Jun. 2022, which claims the benefit of German Patent Application no. 10 2021 206 546.5 filed 24 Jun. 2021, the contents of which are hereby incorporated herein by reference in their entireties.

FIELD OF THE DISCLOSURE

The invention relates to a method for operating a drive train of a motor vehicle, wherein the drive train comprises a drive aggregate, an automated group transmission connected between the drive aggregate and a drive output, and a disconnect clutch connected between the drive aggregate and the group transmission, and wherein the group transmission comprises a plurality of sub-transmissions, namely at least one main transmission and in addition a splitter group drivingly connected upstream from the main transmission and/or a range group drivingly connected downstream from the main transmission. Furthermore, the invention relates to a control unit for operating a drive train of that type.

BACKGROUND

DE 10 2006 054 277 A1 discloses a method for carrying out a gearshift in an automated change-speed transmission. A method is proposed, in which a gearshift can be carried out either with or without using a disconnect clutch and accordingly with or without opening the disconnect clutch. Thus, basic conditions are checked for a gearshift and for shifting while the disconnect clutch is closed, and if the basic conditions are satisfied, disengaging an original gear is permitted while the disconnect clutch is closed. If this disengagement with the disconnect clutch closed has not succeeded, then it is checked whether conditions for engaging the target gear while the disconnect clutch is closed are satisfied, and if that is not the case, the process reverts to the shifting mode of engaging the target gear with the disconnect clutch open. Accordingly, the method according to DE 10 2006 054 277 A1 presupposes that for carrying out a shifting operation in an automated transmission a disconnect clutch is available and can therefore be used and shifted.

The method known from DE 10 2006 054 277 A1 is not suitable for carrying out a shifting operation if the disconnect clutch cannot be used, namely, if the disconnect clutch cannot be shifted.

SUMMARY

There is a need for a method for operating a drive train of a motor vehicle with an automated group transmission, in which shifting operations and therefore gearshifts from a current gear to a target gear can be carried out even when the disconnect clutch cannot be used, i.e., it cannot be shifted.

Starting from there, the purpose of the present invention is to provide a new type of method for operating a drive train of a motor vehicle and a control unit for carrying out the method. This objective is achieved by a method for operating a drive train according to the present disclosure.

If the disconnect clutch cannot be used for carrying out a shifting operation in the group transmission, namely it cannot be shifted, an emergency shifting program is activated. In the emergency shifting program, depending on an input rotation speed of the group transmission, or depending on a rotation speed of the drive aggregate, shifts from a current gear to a target gear of the group transmission when the disconnect clutch is closed can be carried out automatically, exclusively involving the main transmission and/or the range group drivingly connected downstream from the main transmission, but not involving the splitter group drivingly connected upstream from the main transmission.

With the present invention, in the case of a drive train that comprises an automated group transmission, if the disconnect clutch cannot be shifted in order to carry out a shifting operation in the group transmission, it is proposed to activate an emergency shifting program. In the emergency shifting program, shifting operations, and therefore gearshifts from a current gear to a target gear of the group transmission, are carried out, but exclusively with the participation of the main transmission and/or the range group. The splitter group remains unchanged in its condition at the time. With the invention, the availability of a motor vehicle with a group transmission can be increased, since shifting operations can also be carried out even though the disconnect clutch cannot be shifted.

Preferably, when the motor vehicle accelerates, the input rotation speed of the group transmission or the rotation speed of the drive aggregate increases and reaches or exceeds a first limit value, whereupon in the group transmission an upshift is carried out automatically with the participation of the main transmission and/or that of the range group. When the motor vehicle decelerates, the input rotation speed of the group transmission or the rotation speed of the drive aggregate decreases and reaches or falls below a second limit value, whereupon in the group transmission a downshift is carried out automatically with the participation of the main transmission and/or that of the range group. That procedure is particularly preferred for carrying out shifting operations and therefore gearshifts in the group transmission if the disconnect clutch cannot be shifted. Thus, both upshifts and downshifts can be carried out in the group transmission exclusively with the participation of the main transmission and/or the range group.

Preferably, the target gear of the group transmission is determined as a function of the respective limit value, the current gear, and a desired target rotation speed for the input rotation speed of the group transmission or the rotation speed of the drive aggregate, in particular in such manner that the target gear of the group transmission is determined such that the target rotation speed for the input rotation speed of the group transmission or the rotation speed of the drive aggregate is located in a range around the middle between the maximum acceptable rotation speed of the drive aggregate and the idling rotation speed of the drive aggregate. This is particularly preferred in order to increase the availability of the motor vehicle when the disconnect clutch cannot be shifted.

The control unit according to the invention is also disclosed.

BRIEF DESCRIPTION OF THE DRAWINGS

Preferred further developments emerge from the subordinate claims and the description given below. Example embodiments of the invention, to which it is not limited, are explained in greater detail with reference to the drawing, which shows:

DETAILED DESCRIPTION

The present invention relates to a method for operating a drive train of a motor vehicle with an automated group transmission and a control unit for carrying out the method.

Figure 1:
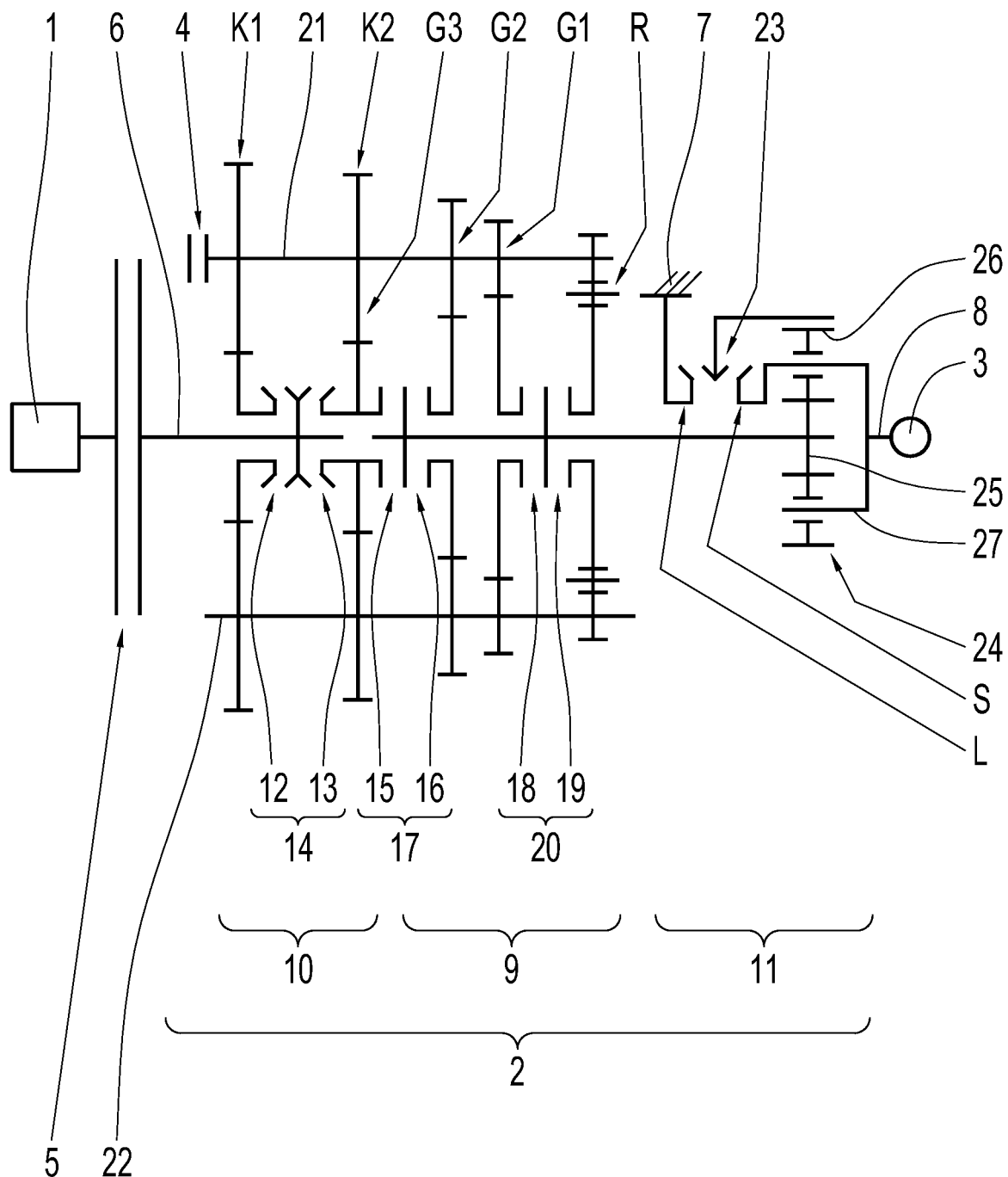
FIG. 1: An example of a layout of a drive train of a motor vehicle.

FIG. 1 shows the layout of a drive train of a motor vehicle comprising a drive aggregate 1, an automated group transmission 2 and a drive output 3. The drive aggregate 1 can be coupled to an input shaft 6 of the group transmission 2 by way of a disconnect clutch 5, also known as a starting clutch. The drive output 3 is coupled to an output shaft 8 of the group transmission 2. In the example embodiment shown, the group transmission 2 comprises a main transmission 9, a splitter group 10 drivingly connected upstream from the main transmission 9, and a range group 11 drivingly connected downstream from the main transmission 9. The main transmission 9 is also called the main group.

The main transmission 9 of the group transmission 2 is configured as a direct-gear transmission of countershaft design and has two countershafts 21, 22. In the example embodiment shown the main transmission 9 has three gears G1, G2, and G3 for forward driving and one gear R for reversing. Loose wheels of the gears G1, G2, and R are in each case mounted rotatably on a main shaft and can be engaged by means of associated shifting elements 15, 16, 18, and 19 in the form of claw-type clutches. The associated fixed wheels are arranged rotationally fixed on the countershafts 21 and 22. The two shifting elements 15, 16 and the two shifting elements 18, 19 form rotation speed shifting packets 17 and 20 respectively. The main transmission 9 can be shifted without synchronization.

In the example embodiment shown, the splitter group 10 of the group transmission 2 has two gears and is also of countershaft design, wherein the two gear ratios K1 and K2 of the splitter group 10 form two shiftable input constants of the main transmission 9. The two gears K1 and K2 have a small gear ration difference.

The loose wheel of the first gear ratio K1 is mounted rotatably on the input shaft 6. The loose wheel of the second gear ratio K2 is mounted rotatably on the main shaft. The fixed wheels of the two gear ratios K1, K2 of the splitter group 10 are respectively arranged rotationally fixed on the countershafts 21, 22 of the main transmission 9, which shafts are extended on the input side. Shifting elements 12 and 13 of synchronized design, i.e., so-termed synchronous shifting elements, of the splitter group 10, are combined in a shared shifting package 14.

The range group 11 of the group transmission 2 connected downstream from the main transmission 9 also comprises two gears, but in the form of a planetary gearset 24. The sun gear 25 is connected rotationally fixed to the main shaft of the main transmission 9, which shaft is extended on the output side. The planetary carrier 27 is connected rotationally fixed to the output shaft 8 of the group transmission 2. The ring gear 26 is connected to a shifting packet with two synchronized shifting clutches, by means of which the range group 11 can be shifted alternatively to a slow-driving stage L by connecting the ring gear 26 to a fixed component 7 of the housing, or to a fast-driving stage S by connecting the ring gear 26 to the planetary carrier 27. The range group 11 can be shifted in a synchronized manner. FIG. 1 also shows an optional transmission brake 4 which engages with the countershaft 21. The countershaft 21 can be braked by the transmission brake 4.

It should be mentioned at this point that although the embodiment of the group transmission 2 shown in FIG. 1 is preferred, it is optional. The invention can also be used with other group transmissions that comprise a main group 9, a range group 11 and a splitter group 10.

The present invention now relates to a method for operating a drive train with an automated transmission 2, by means of which shifting operations or gearshifts from a current gear of the group transmission 2 to a target gear of the group transmission 2 can be carried out if, to carry out the shift in the group transmission 2, the disconnect clutch 5 connected between the drive aggregate 1 and the input shaft 6 of the group transmission 2 cannot be shifted, i.e. it cannot be opened and then closed again.

In the context of the present invention, when the disconnect clutch 5 cannot be used to carry out a shifting operation in the transmission 2, namely it cannot be shifted, an emergency shifting program is activated. In the emergency shifting program, when the disconnect clutch 5 is closed, then as a function of an input rotation speed of the group transmission 2, i.e., as a function of the rotation speed of the input shaft 6 of the group transmission 2, or as a function of a rotation speed of the drive aggregate 1, a gearshift from a current gear of the group transmission 2 to a target gear of the group transmission 2 is carried out automatically, exclusively involving the main transmission 9 and/or the range group 11 drivingly connected downstream from the main transmission 9, but not involving the splitter group 10 drivingly connected upstream from the main transmission 9. Accordingly, in the emergency shifting program when the disconnect clutch 5 is closed, shifting operations or gearshifts are carried out in the group transmission 2 with the participation only of the main transmission 9 and/or the range group 11, but not the splitter group 10. Further details of the invention are described with reference to the signal flow-chart shown in FIG. 2 and to the time diagram shown in FIG. 3.

Figure 2:
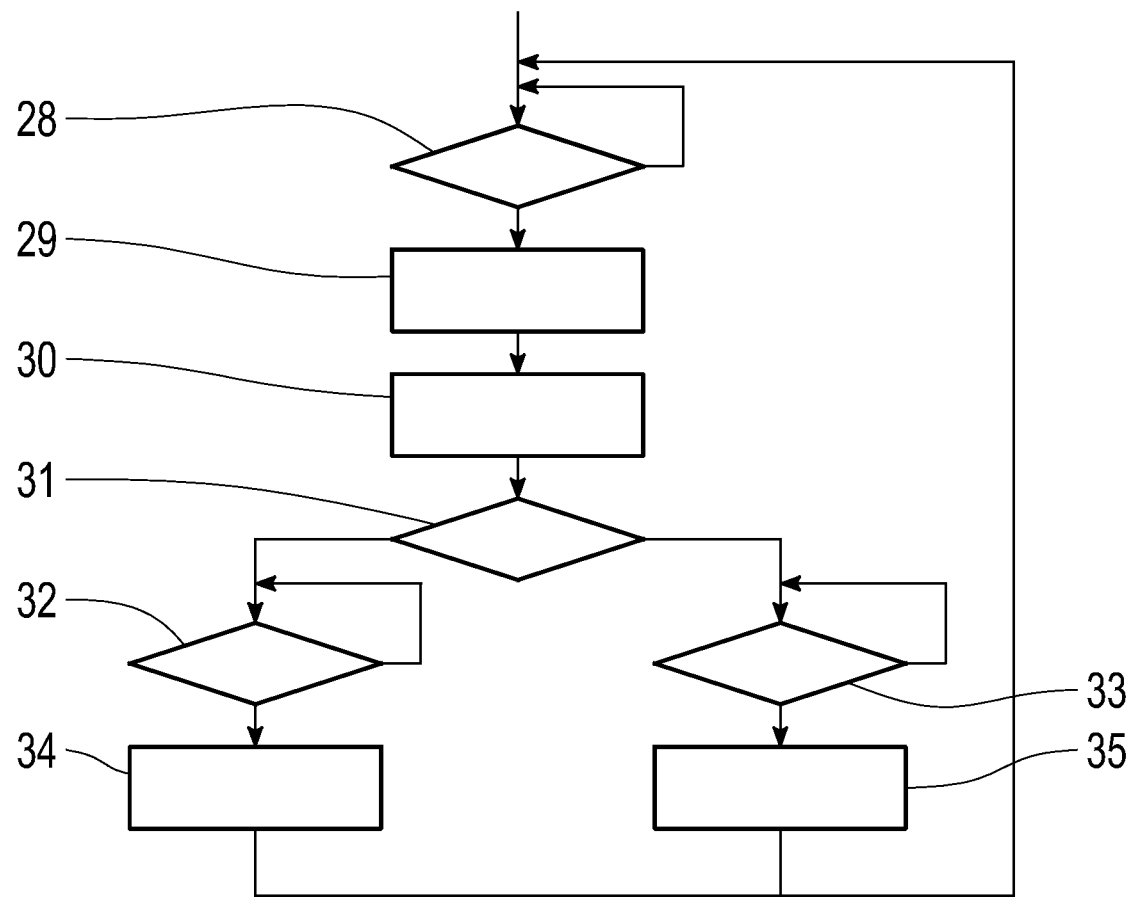
FIG. 2: A signal flow-chart to clarify the invention.

In a block 28 of the signal flow-chart of FIG. 2, it is checked whether the disconnect clutch 5 can be used, namely whether it can be shifted. If the disconnect clutch 5 can be used, then starting from block 28 the process goes back to the beginning. On the other hand, if the disconnect clutch 5 cannot be shifted for carrying out a shifting operation in the group transmission 2, then the process advances from block 28 to block 29. In block 29 a regular shifting program is deactivated. Thereafter, in a block 30 an emergency shifting program is activated.

After that, with the emergency shifting program activated it is checked whether the motor vehicle is accelerating, i.e., whether the input rotation speed of the group transmission 2 or the rotation speed of the drive aggregate 1 is increasing. If so, then starting from block 31 the process advances to block 32. On the other hand, if this is not the case, i.e., if in block 31 it is found that the motor vehicle is decelerating and the input rotation speed of the group transmission 2 or the rotation speed of the drive aggregate 1 is decreasing, then from block 31 the process branches off to block 33.

In block 32 it is checked whether the input rotation speed of the group transmission 2 or the rotation speed of the drive aggregate 1 has reached or exceeded a first limit value. This first limit value is preferably around a rotation speed which is lower than an acceptable maximum rotation speed of the drive aggregate 1 by a defined offset.

If in block 32 it is found that the rotation speed of the drive aggregate 1 or the input rotation speed of the group transmission 2 has not reached or exceeded the first limit value, then starting from block 32 the process reverts to before block 32. On the other hand, if in block 32 it is found that the rotation speed of the drive aggregate 1 or the input rotation speed of the group transmission 2 has reached or exceeded the first limit value, then starting from block 32 the process advances to block 34, and in block 34 the gearshift from the current gear to the target gear is carried out automatically with the exclusive participation of the main transmission 9 and/or the range group 11, and this shift is an upshift with the disconnect clutch 5 closed.

In block 33 it is checked whether the input rotation speed of the group transmission 2 or the rotation speed of the drive aggregate 1 has reached or fallen below a second limit value. The second limit value is a rotation speed which is higher by a defined offset than an idling rotation speed of the drive aggregate 1.

If in block 33 it is found that it is not the case that the input rotation speed of the group transmission 2 or the rotation speed of the drive aggregate 1 has reached or fallen below the second limit value, then the process reverts to before block 33. On the other hand, if in block 33 it is found that as the motor vehicle decelerates the input rotation speed of the group transmission 2 or the rotation speed of the drive aggregate 1 has reached or fallen below the second limit value, then starting from block 33 the process advances to block 35. In block 35, in the group transmission 2 a shift is carried out automatically, namely a downshift with the disconnect clutch 5 closed, which shift takes place with the exclusive participation of the main transmission 9 and/or the participation of the range group 11.

The target gear for the shifting operation of the group transmission 2 to be carried out when the disconnect clutch 5 cannot be shifted and is closed, is determined as a function of the respective limit value, i.e., the first limit value or the second limit value, the current gear, and a desired target rotation speed value for the input rotation speed of the group transmission 2 or the rotation speed of the drive aggregate 1. For this, the target gear of the group transmission 2 is determined in such manner that the target value for the input rotation speed of the group transmission 2 or the rotation speed of the drive aggregate 1 is in a range around the middle between the acceptable maximum rotation speed of the drive aggregate 1 and the idling rotation speed of the drive aggregate 1. For the target rotation speed the target gear with the appropriate gear ratio is chosen, so that after the target gear has been engaged the input rotation speed of the group transmission 2 or the rotation speed of the drive aggregate 1 is as close as possible to that target rotation speed.

Figure 3:
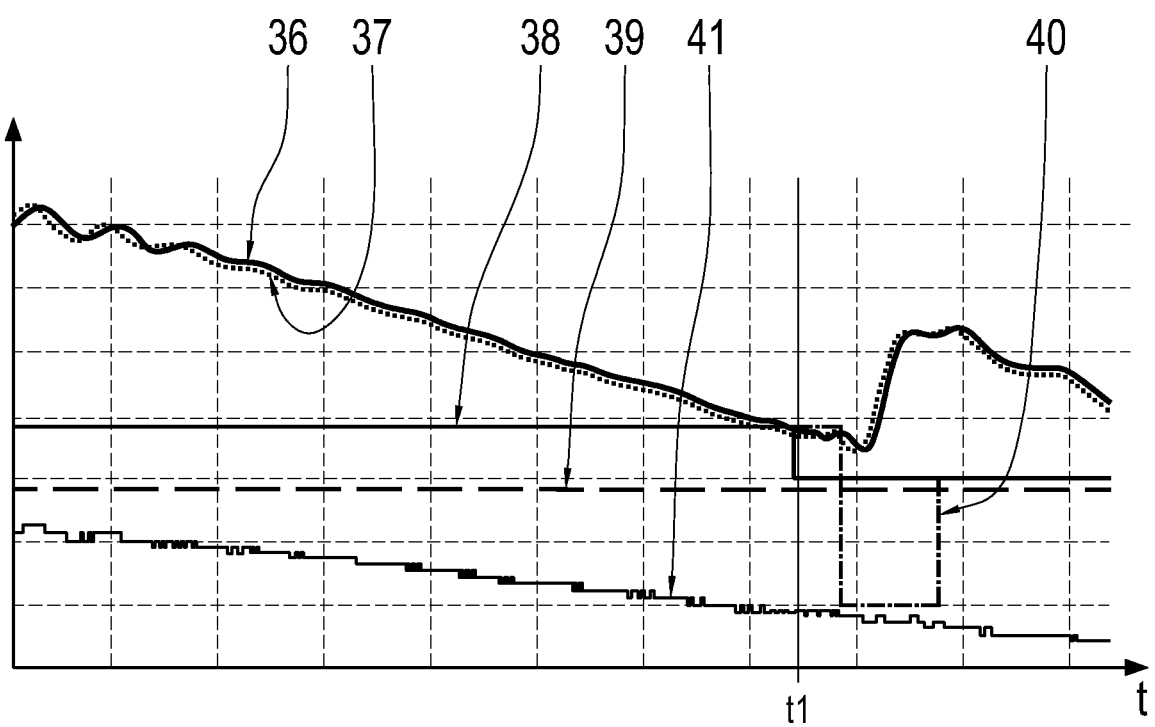
FIG. 3: A time diagram for a downshift.

FIG. 3 shows signal variations with time t, for the case when a downshift is carried out in the group transmission 2. The curve 36 corresponds to the rotation speed of the drive aggregate 1 and the curve 37 corresponds to the input rotation speed of the group transmission 2, wherein the curves 36 and 37 coincide since the disconnect clutch 5 is closed.

In FIG. 3 the motor vehicle is decelerating and the input rotation speed 37 of the group transmission 2 and the rotation speed of the drive aggregate 1 are both decreasing. At time-point t1 the input rotation speed 37 of the group transmission 2 or the rotation speed of the drive aggregate 1 reaches a limit value which is higher than the idling rotation speed of the drive aggregate 1 by a defined offset. Accordingly, at time t1 the target gear for the group transmission 2 changes, so that with a closed disconnect clutch 5 the gearshift from the old target gear to the new target gear is carried out and the shape of the curve 40 shows the current gear in the group transmission 2. From the curve shape 40 it can be seen that to change the group transmission 2 from the current gear to the new target gear, first the current gear is disengaged and the group transmission 2 is changed to neutral, and starting from neutral the new target gear is then engaged in the group transmission 2.

As already stated, a gearshift in the group transmission 2 when the disconnect clutch 5 cannot be used because it is closed, takes place exclusively with the participation of the main transmission 9 and/or the range group 11, but not with the participation of the splitter group 10.

FIG. 3 also shows the time variation of a speed 41 of the motor vehicle. In FIG. 3 this speed 41 is a calculated driving speed of the motor vehicle.

Both the upshift and the downshift that can be carried out using the method according to the invention in the emergency shifting program with the disconnect clutch 5 closed can be carried out as single-gear interval shifts or multiple-gear interval shifts.

As already stated, the particular shift in the group transmission 2 takes place in such manner that after the shift has been carried out, the target rotation speed to be set at the input shaft 6 of the group transmission 2, and thus the rotation speed set at the drive aggregate 1, is located in a range around the middle between the maximum motor rotation speed and the idling rotation speed of the drive aggregate 1.

The invention also relates to a control unit for operating a drive train with an automated group transmission. The control unit is preferably an electrical or electronic transmission control unit, which comprises hardware and software means for carrying out the method according to the invention. The hardware means include data interfaces for exchanging data with the assemblies that participate in carrying out the method according to the invention, for example with the group transmission 2. In addition, the hardware means include a memory for data storage and a processor for data processing. The software means include program modules implemented in the control unit for carrying out the method according to the invention.

The control unit according to the invention is designed to carry out the above-described method automatically. When the disconnect clutch 5 cannot be used for carrying out a shifting operation in the transmission 2, namely it cannot be shifted, the control unit activates an emergency shifting program. In the emergency shifting program, as a function of an input rotation speed of the group transmission 2 or as a function of the rotation speed of the drive aggregate 1 the control unit automatically triggers shifts from a current gear of the group transmission to a target gear of the group transmission 2 when the disconnect clutch 5 is closed, and this is done exclusively with the participation of the main transmission 9 and/or that of the range group 11 drivingly connected downstream therefrom, but not with the participation of the splitter group 10 drivingly connected upstream from the main transmission 9.

With a disconnect clutch 5 that cannot be shifted, i.e. it cannot be opened and subsequently closed again, the invention makes it possible to increase the availability of the motor vehicle by enabling shifting operations in the group transmission 2 when the disconnect clutch 5 is closed, wherein in these shifting operations exclusively the main transmission 9 and/or the range group 11 are involved, but not the splitter group 10.

INDEXES

1 Drive aggregate
2 Group transmission
3 Drive output
4 Transmission brake
5 Disconnect clutch
6 Input shaft
7 Housing component
8 Output shaft
9 Main transmission
10 Splitter group
11 Range group
12 Synchronous shifting element
13 Synchronous shifting element
14 Shifting packet
15 Shifting element
16 Shifting element
17 Shifting packet
18 Shifting element
19 Shifting element
20 Shifting packet
21 Countershaft
22 Countershaft
23 Shifting packet
24 Planetary gearset
25 Sun gear
26 Ring gear
27 Planetary carrier
28 Block
29 Block
30 Block
31 Block
32 Block
33 Block
34 Block
35 Block
36 Transmission input rotation speed
37 Drive aggregate rotation speed
38 Target gear
39 Idling rotation speed
40 Current gear
41 Speed of the vehicle

The invention claimed is:

1. A method for operating a drive train of a motor vehicle, drive train comprising a drive aggregate, a drive output, an automated group transmission connected between the drive aggregate and the drive output, and a disconnect clutch connected between the drive aggregate and the group transmission, wherein the group transmission comprises a plurality of sub-transmissions that include at least one of (i) a main transmission and a splitter group drivingly connected upstream from the main transmission and (ii) a range group drivingly connected downstream from the main transmission, wherein when the disconnect clutch cannot be used to carry out a shifting operation in the group transmission, namely it cannot be shifted, an emergency shifting program is activated,
   closing the disconnect clutch; and
   shifting automatically, according to an emergency shifting program, from a current gear to a target gear of the group transmission, wherein the emergency shifting program is performed as a function of an input rotation speed of the group transmission or as a function of a rotation speed of the drive aggregate;
wherein the main transmission and/or the range group participate exclusively in the shifting.

2. The method according to claim 1, comprising:
determining, when the motor vehicle is accelerating, that an input rotation speed of the group transmission or the rotation speed of the drive aggregate increases and reaches or exceeds a first limit value; and
carrying out an upshift automatically in the group transmission with the participation of the main transmission and/or the participation of the range group.

3. The method according to claim 2, wherein the first limit value is lower than an acceptable maximum rotation speed of the drive aggregate by a pre-defined offset.

4. The method according to claim 1, comprising:
carrying out a downshift automatically in the group transmission, with the participation of the main transmission and/or the participation of the range group, when the motor vehicle is decelerating and an input rotation speed of the group transmission or a rotation speed of the drive aggregate decreases and reaches or falls below a second limit value, and in the group transmission.

5. The method according to claim 4, wherein the second limit value is higher than an idling rotation speed of the drive aggregate by a pre-defined offset.

6. The method according to claim 1, comprising:
determining the target gear of the group transmission as a function of the limit value, of a current gear, and of a desired target rotation speed value for the input rotation speed of the group transmission or the rotation speed of the drive aggregate.

7. The method according to claim 6, comprising:
determining the target gear of the group transmission in such manner that a target rotation speed for the input rotation speed of the group transmission or the rotation speed of the drive aggregate is located in a range around the middle between the acceptable maximum rotation speed of the drive aggregate and an idling rotation speed of the drive aggregate.

8. A control unit configured for operating a drive train of a motor vehicle, wherein:
the drive train comprises a drive aggregate, a drive output, an automated group transmission connected between the drive aggregate and the drive output, and a disconnect clutch connected between the drive aggregate and the group transmission, wherein the group transmission comprises a plurality of sub-transmissions that include a main transmission and a splitter group drivingly connected upstream from the main transmission, and a range group drivingly connected downstream from the main transmission;
the disconnect clutch cannot be shifted to carry out a shifting operation in the group transmission; and
the control unit is configured to activate an emergency shifting program, wherein gearshifts from a current gear of the group transmission to a target gear of the group transmission are carried out automatically by the control unit as a function of a rotation speed of the drive aggregate with the disconnect clutch closed, with the exclusive participation of the main transmission and/or the range group, and without participation of the splitter group.

9. The control unit according to claim 8, wherein the control unit is configured to carry out automatically the method according to claim 1.

* * * * *